US007587373B2

(12) United States Patent
Smith, Jr. et al.

(10) Patent No.: US 7,587,373 B2
(45) Date of Patent: Sep. 8, 2009

(54) NEURAL NETWORK BASED WELL LOG SYNTHESIS WITH REDUCED USAGE OF RADIOISOTOPIC SOURCES

(75) Inventors: Harry D. Smith, Jr., Montgomery, TX (US); John A. Quirein, Georgetown, TX (US); Jeffery L. Grable, Houston, TX (US); Dingding Chen, Plano, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 204 days.

(21) Appl. No.: 11/270,284

(22) Filed: Nov. 9, 2005

(65) Prior Publication Data

US 2007/0011115 A1    Jan. 11, 2007

Related U.S. Application Data

(63) Continuation-in-part of application No. 11/165,892, filed on Jun. 24, 2005.

(51) Int. Cl.
*G06E 1/00* (2006.01)
*G06E 3/00* (2006.01)

(52) U.S. Cl. ............................... 706/16; 706/15; 706/20

(58) Field of Classification Search .................. 706/16, 706/15, 20; 702/6, 1
See application file for complete search history.

(56) References Cited

U.S. PATENT DOCUMENTS

| | | | |
|---|---|---|---|
| 3,802,259 A | 4/1974 | Eckels | |
| 3,946,226 A | 3/1976 | Smith, Jr. | |
| 3,975,157 A | 8/1976 | Smith | |
| 4,055,763 A | 10/1977 | Antkiw | |
| 4,122,339 A | 10/1978 | Smith, Jr. et al. | |
| 4,122,340 A | 10/1978 | Smith, Jr. et al. | |
| 4,239,965 A | 12/1980 | Oliver et al. | |
| 4,293,933 A | 10/1981 | Park et al. | |
| 4,297,575 A | 10/1981 | Smith, Jr. et al. | |
| 4,430,567 A | 2/1984 | Oliver et al. | |

(Continued)

FOREIGN PATENT DOCUMENTS

| | | |
|---|---|---|
| EP | 0552073 B1 | 7/1993 |
| EP | 0552073 | 3/1997 |
| JP | 04089998 A | 3/1992 |
| WO | 9964896 | 12/1999 |

OTHER PUBLICATIONS

Helle, H. et al. "Fluid Saturation From Well Logs Using Comittee Neural Networks", Petroleum Geoscience, vol. 8, 2002.*

(Continued)

*Primary Examiner*—David R Vincent
*Assistant Examiner*—Adrian L Kennedy

(57) ABSTRACT

Logging systems and methods are disclosed to reduce usage of radioisotopic sources. Some embodiments comprise collecting at least one output log of a training well bore from measurements with a radioisotopic source; collecting at least one input log of the training well bore from measurements by a non-radioisotopic logging tool; training a neural network to predict the output log from the at least one input log; collecting at least one input log of a development well bore from measurements by the non-radioisotopic logging tool; and processing the at least one input log of the development well bore to synthesize at least one output log of the development well bore. The output logs may include formation density and neutron porosity logs.

28 Claims, 8 Drawing Sheets

U.S. PATENT DOCUMENTS

| | | | |
|---|---|---|---|
| 4,605,854 | A | 8/1986 | Smith, Jr. |
| 4,617,825 | A | 10/1986 | Ruhovets |
| 4,645,926 | A | 2/1987 | Randall |
| 4,646,240 | A | 2/1987 | Serra et al. |
| 4,656,354 | A | 4/1987 | Randall |
| 4,912,655 | A | 3/1990 | Wood |
| 4,926,488 | A | 5/1990 | Nadas et al. |
| 5,112,126 | A | 5/1992 | Graebner |
| 5,189,415 | A | 2/1993 | Shimada et al. |
| 5,251,286 | A * | 10/1993 | Wiener et al. ............... 706/20 |
| 5,374,823 | A | 12/1994 | Odom |
| 5,444,619 | A | 8/1995 | Hoskins et al. |
| 5,461,698 | A | 10/1995 | Schwanke et al. |
| 5,465,321 | A | 11/1995 | Smyth |
| 5,469,404 | A | 11/1995 | Barber et al. |
| 5,475,509 | A | 12/1995 | Okamoto |
| 5,517,854 | A | 5/1996 | Plumb et al. |
| 5,525,797 | A | 6/1996 | Moake |
| 5,608,214 | A | 3/1997 | Baron et al. |
| 5,608,215 | A | 3/1997 | Evans |
| 5,828,981 | A * | 10/1998 | Callender et al. ............ 702/6 |
| 5,848,379 | A | 12/1998 | Bishop |
| 5,862,513 | A | 1/1999 | Mezzatesta et al. |
| 5,870,690 | A | 2/1999 | Frenkel et al. |
| 5,875,284 | A | 2/1999 | Wattanabe et al. |
| 5,900,627 | A | 5/1999 | Odom et al. |
| 5,940,777 | A | 8/1999 | Keskes |
| 6,044,327 | A | 3/2000 | Goldman |
| 6,092,017 | A | 7/2000 | Ishida et al. |
| 6,140,816 | A | 10/2000 | Herron |
| 6,150,655 | A | 11/2000 | Odom et al. |
| 6,192,352 | B1 | 2/2001 | Alouani et al. |
| 6,207,953 | B1 | 3/2001 | Wilson |
| 6,216,134 | B1 | 4/2001 | Heckerman et al. |
| 6,272,434 | B1 | 8/2001 | Wisler et al. |
| 6,295,504 | B1 | 9/2001 | Ye et al. |
| 6,317,730 | B1 | 11/2001 | Neuneier et al. |
| 6,374,185 | B1 | 4/2002 | Taner et al. |
| 6,381,591 | B1 | 4/2002 | Hoffmann et al. |
| 6,411,903 | B2 | 6/2002 | Bush |
| 6,424,956 | B1 | 7/2002 | Werbos |
| 6,456,990 | B1 | 9/2002 | Hoffmann et al. |
| 6,466,893 | B1 | 10/2002 | Latwesen et al. |
| 6,477,469 | B2 | 11/2002 | Ye et al. |
| 6,615,211 | B2 | 9/2003 | Beygelzimer et al. |
| 6,704,436 | B1 | 3/2004 | Anxionnaz et al. |
| 6,789,620 | B2 | 9/2004 | Schultz et al. |
| 2002/0147695 | A1 | 10/2002 | Khedkar et al. |
| 2002/0152030 | A1 | 10/2002 | Schultz |
| 2002/0165911 | A1 | 11/2002 | Gabber et al. |
| 2002/0170022 | A1 | 11/2002 | Shirai et al. |
| 2002/0177954 | A1 | 11/2002 | Vail |
| 2002/0178150 | A1 | 11/2002 | Hytopoulos et al. |
| 2002/0183932 | A1 | 12/2002 | West et al. |
| 2002/0187469 | A1 | 12/2002 | Kolodner et al. |
| 2002/0188424 | A1 | 12/2002 | Grinstein et al. |
| 2004/0019427 | A1 | 1/2004 | San Martin et al. |
| 2004/0117121 | A1 | 6/2004 | Gray et al. |
| 2004/0133531 | A1 * | 7/2004 | Chen et al. ............... 706/8 |
| 2004/0222019 | A1 | 11/2004 | Estes et al. |
| 2004/0257240 | A1 * | 12/2004 | Chen et al. ............ 340/853.1 |
| 2005/0246297 | A1 | 11/2005 | Chen et al. |
| 2007/0011114 | A1 | 1/2007 | Chen et al. |
| 2007/0011115 | A1 | 1/2007 | Smith et al. |

OTHER PUBLICATIONS

Anonymous, "Log Interpretation Charts," Dresser Atlas, Dresser Industries, Inc., USA, Jun. 1983, 2 pages.

Tittman, J. et al., "The Physical Foundations Of Formation Density Logging (Gamma Gamma)," Goephysics, vol. XXX, No. 2, Apr. 1965, pp. 284-293.

Odom, Richard C. et al., "A New 1.625" Diameter Pulsed Neutron Capture And Inelastic/Capture Spectral Combination System Provides Answers In Complex Reservoirs," SPWLA 35th Annual Logging Symposium, Jun. 1994, 19 pages.

Odom, Richard C., Program And Pertinent Slides From A Presentation by Richard C. Odom at SIAM Symposium On Inverse Problems: Geophysical Applications, Dec. 17, 1995, 5 pages.

Randall, Russel R. et al., "PDK-100 Log Examples In The Gulf Coast," 26th Annual SPWL Logging Symposium, Jun. 17-20, 1985, 6 pages.

Randall, Russel R. et al., "PDK-100 Enhances Interpretation Capabilities For Pulsed Neutron Capture Logs," 27th Annual SPWL Logging Symposium, Jun. 9-13, 1985, 6 pages.

Schnieder, B.D., et al., "Using Pulsed Neutron Decay-Spectrum Data And Multi-Inflatable Packer Plugdown Assemblies Improve Oil Production Rates In a Mature $CO_2$ Flood," SPE 35165, SPE Permian Basin Oil & Gas Recovery Conference, Mar. 27-29, 1996, pp. 167-176, Midland, Texas.

Odom, R.C. et al., "Applications And Derivation Of A New Cased-Hole Density Porosity In Shaly Sands," SPE 38699, SPE Annual Technical Conference and Exhibition, Oct. 5-8, 1997, pp. 475-487, San Antonio, Texas.

Odom, R.C. et al., "Shaly Sand Analysis Using Density-Neutron Porosities From A Cased-Hole Pulsed Neutron System," SPE 55641, SPE Rocky Mountain Regional Meeting, May 15-18, 1999, 10 pages, Gillette, Wyoming.

Odom, R.C. et al., "A Pulsed Neutron Analysis Model For Carbon Dioxide Floods: Application To The Reinecke Field, West Texas," SPE 59717, SPE Permian Basin Oil & Gas Recovery Conference, Mar. 21-23, 2000, 4 pages, Midland, Texas.

Odom, R.C. et al., "Examples Of Cased Reservoir Analysis In The Ventura Basin, California," SPE 62850 SPE/AAPG Western Regional Meeting, Jun. 19-23, 2000, 7 pages, Long Beach, California.

Odom, R.C. et al., "Assessing The Capabilities Of A Cased-Hole Reservoir Analysis System In The Gulf Of Thailand," SPE 64404, SPE Asia Pacific Oil And Gas Conference And Exhibition, Oct. 16-18, 2000, 10 pages, Brisbane, Australia.

Odom, R.C. et al., "Log Examples With A Prototype Three-Detector Pulsed-Neutron System For Measurement Of Cased-Hole Neutron And Density Porosities," SPE 71042, SPE Rocky Mountain Petroleum Technology Conference, May 21-23, 2001, Keystone, Colorado, 10 pages.

Odom, R.C. et al., "Improvements In A Through-Casing Pulsed-Netron Density Log," SPE 71742, SPE Annual Technical Conference And Exhibition, Sep. 30-Oct. 3, 2001, New Orleans, Louisiana, 9 pages.

International Search Report and Written Opinion for PCT/US06/25029 dated Mar. 21, 2007, unpublished, Halliburton Energy Services, Inc.

Dahl, "Structured Programming", Academic Press, A.P.I.C. Studies in Data Processing, No. 8, 1972, pp. 7 and 19.

Hansen, "Neural Network Ensembles", IEEE Transactions on Pattern Analysis and Machine Intelligence, vol. 12, No. 10, 1990, pp. 993-1001.

Krogh, "Neural Network Ensembles, Cross Validation, and Active Learning", Advances in Neural Information Processing Systems 7, MIT Press, Cambridge, Maine, 1995, pp. 231-238.

Twomey, "Committee Networks by Resampling" in Intelligent Engineering Systems through 5 Artificial Neural Networks, ASME Press, 1995, vol. 5, pp. 153-158.

Maclin, "Combining the Predictions of Multiple Classifiers: Using Competitive Learning to Initialize Neural Networks", 14th International Joint Conference on Artificial Intelligence, Montreal, Canada, 1995, pp. 524-530.

Sollich, "Learning with Ensembles: How Over-Fitting Can be Useful" in Advances in Neural 20 Information Processing Systems 8, Cambridge, MA: MIT Press, 1996, pp. 190-196.

Fung, "Modular Artificial Neural Network for Prediction of Petrophysical Properties from Well Log Data", IEEE Instrumentation and Measurement Technology Conference, Brussels, Belgium, Jun. 4-6, 1996, pp. 1010-1014.

Opitz, "A Genetic Alogorithm Approach for Creating Neural-Network Ensembles", Combining Artificial Neural Nets, http://citeseer.ist.psu.edu/opitz99genetic.html, 1999, Springer-Verlag. London, pp. 79-99.

Liu, "Ensemble Learning via Negative Correlation", Neural Networks, vol. 12, Issue 10, www.elsevier.com/locate/neunet, Dec. 1999, pp. 1399-1404.

Obayashi, "Multiobjective Evolutionary Computation for Supersonic Wing-Shape Optimization", IEEE Transactions on Evolutionary Computation, vol. 4, No. 2, 2000, pp. 182-187.

Renner, "Combining Constructive Neural Networks for Ensemble Classification", AIM, Fifth Joint Conference on Information Sciences, Feb. 2000, pp. 1-6.

Liu, "Evolutionary Ensembles with Negative Correlation Learning", IEEE Transactions on Evolutionary Computation, vol. 4, No. 4, Nov. 2000, pp. 380-387.

Mullen, "The Applications of Neural Networks to Improve the Usability of Pulsed Neutron Logs for Evaluating Infill Well Locations in the Piceance Basin of Western Colorado and the San Juan Basin of Northwest New Mexico", SPE Rocky Mountain Petroleum Technology Conference, Keystone, Colorado, 2001, pp. 1-14.

Zhou, "Genetic Algorithm Based Selective Neural Network Ensemble", 17th International Joint Conference on Artificial Intelligence, vol. 2, Seattle, WA, pp. 797-802.

Hampson, "Use of Multiattribute Transforms to Predict Log Properties from Seismic Data", Society of Exploration Geophysicists, Geophysics vol. 66. No. 1, Jan.-Feb. 2001, pp. 220-236.

Granitto, "Modeling of Sonic Logs in Oil Wells With Neural Network Ensembles", Argentine Symposium on Artificial Intelligence (ASAI'01), http://citeseer.ist.psu.edu/granitto01/modeling.html, Sep. 12-13, 2001, 7 pages.

Everson, "Full Elite-Sets for Multi-Objective Optimisation", Fifth International Conference on Adaptive Computing in Design and Manufacture (ACDM 2002), http://www.dcs.ex.ac.uk/academics/reverson/pubs/adcomp-abs.html, (download Jun. 14, 2004), 8 pages.

Yang, "Managing Approximation Models in Multiobjective Optimization", Structure and Multidisciplinary Optimization, vol. 24, No. 2, 2002, pp. 141-156.

Jin, "A Framework for Evolutionary Optimization with Approximate Fitnesss Functions", IEEE Transactions on Evolutionary Computation, vol. 6, No. 5, 2002, pp. 481-494.

Gaspar-Cunha, "RPSGAe—Reduced Pareto Set Genetic Algorithm with Elitism", Workshop on Multiple Objective Metaheuristics, Nov. 2002, Paris, France, 6 pages.

Flowjo, "Clustering—A New, Highly Efficient Algorithm for Cluster Analysis", FlowJo Reference Manual, FlowJo Version 4, www.flowjo.com/v4/html/cluster.html, Dec. 30, 2002 (download), pp. 1-3.

Flowjo, "Clustering—Clustering Algorithm Parameters", FlowJo Reference Manual, FlowJo Version 4, www.flowjo.com/v4/html/clusterparams.html, Dec. 30, 2002 (download), pp. 1-5.

Flowjo, "Clustering—Play-by-Play of Clustering Process", FlowJo Reference Manual, FlowJo Version 4, www.flowjo.com/v4/html/clusterprocess.html, Dec. 30, 2002 (download), pp. 1-2.

Brown, Negative Correlation Learning and the Ambiguity Family of Ensemble Methods, Springer-Verlag Berlin, Heidelberg, MCS 2003, LNCS 2709, 2003, pp. 266-275.

Abbass, "Pareto Neuro-Evolution: Constructing Ensemble of Neural Networks Using Multi-Objective Optimization", Congress on Evolutionary Computation, Canberra, Australia, 2003, pp. 2074-2080.

Quirein, "An Assessment of Neural Networks Applied to Pulsed Neutron Data for Predicting Open Hole Triple Combo Data", 2003, 14 pages.

Ong, "Evolutionary Optimization of Computationally Expensive Problems via Surrogate Modeling", AIAA Journal, vol. 1, No. 4, Apr. 2003, pp. 1-10.

Islam, et al., "A Constructive Algorithm for Training Cooperative Neural Network Ensembles", IEEE Transactions on Neural Networks, vol. 14, No. 4, Jul. 2003, pp. 820-834.

Jin, Neural Network Regularization and Ensembling Using Multi-Objective Evolutionary Algorithms, Congress on Evolutionary Computation, Portland, Oregon, 2004, 8 pages.

Chandra, "Divace: Diverse and Accurate Ensemble Learning Algorithm", The Fifth International Conference on Intelligent Data Engineering and Automated Learning, Exeter, UK, 2004, pp. 619-625.

Brown, "Diversity Creation Methods: A Survey and Categorization" Journal of Information Fusion, vol. 6, No. 1, Jan. 2005, pp. 5-20.

Torres-Sospedra, "A Research on Combination Methods for Ensembles of Multilayer Feedforward", International Joint Conference on Neural Networks, Montreal, Canada, Jul. 31-Aug. 4, 2005, pp. 1-6.

Zhou, "A Study on Polynomial Regression and Gaussian Process Global Surrogate Model in Hierarchical Surrogate- Assisted Evolutionary Algorithm", IEEE Congress on Evolutionary Computation, Edinburgh, United Kingdom, Sep. 2005, 6 pages.

Hamza, Vehicle Crashworthiness Design via a Surrogate Model Ensemble and a Co-Evolutionary Genetic Algorithm, ASME International Design Engineering Technical Conferences & Computers and Information in Engineering Conference, Long Beach, California, Sep. 24-28, 2005.

Chen, "Neural Network Ensemble-Selection Using a Multi-Objective Genetic Algorithm in Processing Pulsed Neutron Data", Petrophysics, vol. 46, No. 5, Oct. 2005.

Coelho, "The Influence of the Pool of Candidates on the Performance of Selection and Combination Techniques in Ensembles", International Joint Conference on Neural Networks, Vancouver, BC, Canada, 2006, pp. 10588-10595.

Dutta, "A Hybrid Ensemble Model of Kriging and Neural Networks for Ore-Grade Estimation", International Journal of Surface Mining, Reclamation and Environment, vol. 20, No. 1, 2006, pp. 22-45.

Chen, "Variable Input Neural Network Ensembles in Generating Synthetic Well Logs", International Joint Conference on Neural Networks, Vancouver, BC, Canada, 2006, pp. 2273-2280.

Castillo, "Multiobjective Optimization of Ensembles of Multilayer Perceptrons for Pattern Classification", Parallel Problem Solving from Nature IX, Iceland, 2006, pp. 453.462.

Halliburton Energy Services, Inc., U.S. Appl. No. 10/393,641, "Neural Network Training Data Selection Using Memory Reduced Cluster Analysis for Field Model Development", filed Mar. 21, 2003.

Halliburton Energy Services, Inc., U.S. Appl. No. 10/811,403, "Genetic Algorithm Based Selection of Neural Network Ensemble for Processing Well Logging Data", filed Mar. 26, 2004.

PCT International Search Report and Written Opinion, dated Dec. 3, 2004, Serial No. PCT/US03/41239, "Neural Network Training Data Selection Using Memory Reduced Cluster Analysis for Field Model Development", filed Dec. 23, 2003.

Halliburton Energy Services, Inc., U.S. Appl. No. 11/165,892, "Ensembles of Neural Networks with Different Input Sets", filed Jun. 24, 2005.

U.S. Non-Final Office Action, dated Jan. 20, 2006, U.S. Appl. No. 10/393,641, "Neural Network Training Data Selection Using Memory Reduced Cluster Analysis for Field Model Development", filed Jun. 8, 2006.

U.S. Final Office Action, dated Jun. 8, 2006, U.S. Appl. No. 10/393,641, "Neural Network Training Data Selection Using Memory Reduced Cluster Analysis for Field Model Development", filed Jun. 8, 2006.

U.S. Advisory Action, dated Oct. 17, 2006, U.S. Appl. No. 10/393,641, "Neural Network Training Data Selection Using Memory Reduced Cluster Analysis for Field Model Development", filed Jun. 8, 2006.

U.S. Non-Final Office Action, dated Oct. 20, 2006, U.S. Appl. No. 10/811,403, Genetic Algorithm Based Selection of Neural Network Ensemble for Processing Well Logging Data, filed Mar. 26, 2004.

PCT International Search Report and Written Opinion, dated Mar. 21, 2007, Serial No. PCT/US006/25029, Well Logging with Reduced Usage of Radio so topic Sources, filed Jun. 26, 2006.

U.S. Final Office Action, dated May 7, 2007, U.S. Appl. No. 10/811,403, Genetic Algorithm Based Selection of Neural Network Ensemble for Processing Well Logging Data, filed Mar. 26, 2004.

U.S. Non-Final Office Action, dated Jul. 9, 2007, U.S. Appl. No. 10/393,641, "Neural Network Training Data Selection Using Memory Reduced Cluster Analysis for Field Model Development", filed Jun. 8, 2006.
U.S. Non-Final Office Action, dated Aug. 28, 2007, U.S. Appl. No. 11/165,892, "Ensembles of Neural Networks with Different Input Sets", filed Jun. 24, 2005.
U.S. Final Office Action, dated Dec. 5, 2007, U.S. Appl. No. 10/393,641, "Neural Network Training Data Selection Using Memory Reduced Cluster Analysis for Field Model Development", filed Jun. 8, 2006.
U.S. Non-Final Office Action, dated Apr. 9, 2008, U.S. Appl. No. 11/165,892, "Ensembles of Neural Networks with Different Input Sets", filed Jun. 24, 2005.
Halliburton Energy Services, Inc., U.S. Appl. No. 12/048,045, "Neural Network Based Surrogate Model Construction Methods and Applications Thereof", filed Mar. 13, 2008.
"International Search Report and Written Opinion", Dated Jul. 3, 2008, Serial No. PCT/US06/21158, "Ensembles of Neural Networks with Different Input Sets", filed Jun. 1, 2006.
"International Search Report and Written Opinion", dated Mar. 20, 2008, Serial No. PCT/US05/09494, "Genetic Algorithm Based Selection of Neural Network Ensemble for Processing Well Logging Data", filed Mar. 22, 2006.
"US Advisory Action", dated Jun. 18, 2008, U.S. Appl. No. 10/393,641, "Neural Network Training Data Selection Using Memory Reduced Cluster Analysis for Field Model Development", filed Jun. 8, 2006.
"US Final Office Action", dated Dec. 5, 2007, U.S. Appl. No. 10/393,641, "Neural Network Training Data Selection Using Memory Reduced Cluster Analysis for Field Model Development", filed Jun. 8, 2006.
"US Final Office Action", dated Nov. 24, 2008, U.S. Appl. No. 11/165,892, Ensembles of Neural Networks with Different Input Sets, filed Jun. 24, 2005.
"US Non-Final Office Action", dated, Apr. 9, 2008, U.S. Appl. No. 11/165,892, "Ensembles of Neural Networks with Different Input Sets", filed Jun. 24, 2005.
"US Non-Final Office Action", dated Aug. 28, 2007, U.S. Appl. No. 11/165,892, "Ensembles of Neural Networks with Different Input Sets", filed Jun. 24, 2005.
Anonymous, "Log Interpretation Charts", Dresser Atlas, Dresser Industries, Inc., USA (Jun. 1983), 2 pages.
Brown, G. et al., "Negative Correlation Learning and the Ambiguity Family of Ensemble Methods", Springer-Verlag Berlin Heidelberg (2003), pp. 266-275.
Chen, Dingding "Neural Network Ensemble Selection Using a Multi-Objective Genetic Algorithm in Processing Pulsed Neutron Data", Petrophysics, vol. 46, No. 5 (Oct. 2005), pp. 323-334.
Everson, R.M. et al., "Full Elite-Sets for Multi-objective Optimization", Fifth Int'l Conf. on Adaptive Computing in Design and Manufacture (ACDM 2002), 8 pages.
Fung, C. C., et al., "Modular Artificial Neural Network for Prediction of Petrophysical properties from Well Log Data", IEEE Instrumentation & Measurement Tech Conference, 1996, 5 pages.
Gaspar-Cunha, A. "RPSGAe-Reduced Pareto Set Genetic Algorithm: A Multiobjective Genetic Algorithm with Elitism", Workshop on Multiple Objective Metaheuristics, Carre des Sciences, Paris, France (Nov. 2002), 6 pages.
Granitto, P.M. et al., "Modeling of Sonic Logs in Oil Wells with Neural Network Ensembles", Argentine Symposium on Artificial Intelligence (ASA! '01), Bs., http://citeseer.ist.psu.edu/granitto01modeling.html (Sep. 12, 2001), 7 pages.
Halliburton Energy Services, Inc., U.S. Appl. No. 12/190,418, "Systems and Methods Employing Cooperative Optimization-Based Dimensionality Reduction", filed Aug. 6, 2008.
Halliburton Energy Services, Inc., U.S. Appl. No. 12/048,045, "Neural-Network Based Surrogate Model Construction Methods and Applications Thereof", filed Mar. 13, 2008.
Helle, Hana et al., "Fluid Saturation from Well Logs Using Committee Neural Networks", Petroleum Geoscience, vol. 8 (2002), pp. 109-118.

Islam, Monirul et al., "A Constructive Algorithm for Training Cooperative Neural Network Ensembles", IEEE Transactions on Neural Networks, vol. 14, No. 4 (Jul. 2003), pp. 820-834.
Krough, A. et al., "Neural Network Ensembles, Cross Validation, and Active Learning", Advances in Neural Information Processing Systems 7, Cambridge, MA MIT Press (1995), pp. 231-238.
Lespinats, et al., "DD-HDS: A Method for Visualization and Exploration of High-Dimensional Data", IEEE, Transactions on Neural Networks, vol. 18, No. 5 (Sep. 2007), pp. 1265-1279.
Liu, Y. et al., "Ensemble Learning via Negative Correlation", Neural Networks, vol. 12, Issue 10 (Dec. 1999), pp. 1399-1404.
Liu, Y. et al., "Evolutionary Ensembles with Negative Correlation Learning", IEEE Transactions on Evolutionary Computation, vol. 4, No. 4 (Nov. 2000), pp. 380-387.
Odom, R.C. et al., "Applications and Derivation of a New Cased-Hole Density Porosity in Shaly Sands", SPE 38699, SPE Annual Technical Conference and Exhibition, San Antonio, Texas (Oct. 5, 1997), pp. 475-487.
Odom, Richard C. et al., "A New 1.625 Diameter Pulsed Neutron Capture and Inelastic/Capture Spectral Combination System Provides Answers in Complex Reservoirs", SPWLA 35th Annual Logging Symposium (Jun. 1994), 19 pages.
Odom, Richard C., "A Pulsed Neutron Analysis Model for Carbon Dioxide Floods: Application to the Reinecke Field, West Texas", 2000 SPE Permian Basin Oil and Gas Recovery Conference (Mar. 21, 2000), 4 pages.
Odom, Richard C., et al., "Assessing the Capabilities of a Cased-Hole Reservoir Analysis System in the Gulf of Thailand", SPE 64404, SPE Asia Pacific Oil and Gas Conference and Exhibition, Brisbane, Australia (Oct. 16, 2000), 10 pages.
Odom, Richard C., et al., "Examples of Cased Reservoir Analysis in the Ventura Basin, California", SPE 62850 SPE/AAPG Western Regional Meeting, Long Beach, California (Jun. 19, 2000), 7 pages.
Odom, Richard C., et al., "Improvements in a Through-Casing Pulsed- Neutron Density Log", SPE 71742, SPE Annual Technical Conference and Exhibition, New Orleans, Louisiana (Sep. 30, 2001), 9 pages.
Odom, Richard C., et al., "Log Examples with a Prototype Three-Detector Pulsed-Neutron System for Measurement of Cased-Hole Neutron and Density Porosities", SPE 71042, SPE Rocky Mountain Petroleum Technology Conference, Keystone, Colorado (May 21, 2001), 10 pages.
Odom, Richard C., et al., "Program and Pertinent Slides from a Presentation by Richard C. Odom", SIAM Symposium On Inverse Problems, Geophysical Applications, Geophysical Applications (Dec. 17, 1995), 5 pages.
Odom, Richard C., et al., "Shaly Sand Analysis Using Density-Neutron Porosities from a Cased-Hole Pulsed Neutron System", SPE 55641, SPE Rocky Mountain Regional Meeting, Gillette, Wyoming (May 15, 1999), 10 pages.
Randall, Russel R., et al., "PDK-100 Enhances Interpretation Capabilities For Pulsed Neutron Capture Logs", 27th Annual SPWL Logging Symposium (Jun. 9, 1986), 6 pages.
Randall, Russel R., et al., "PDK-100 Log Examples In The Gulf Coast", 26th Annual SPWL Logging Symposium (Jun. 17, 1985), 6 pages.
Schnieder, B.D. et al., "Using Pulsed Neutron Decay-Spectrum Data and Multi-Inflatable Packer Plugdown Assemblies Improve Oil Production Rates in a Mature CO2 Flood", SPE 35165, SPE Permian Basin Oil & Gas Recovery Conference, Midland, Texas (Mar. 27, 1996), pp. 167-176.
Streeter, R.W. et al., "Cased Hole Exploration: Modern Pulsed Neutron Techniques For Locating By-Passed Hydrocarbons in Old Wells", SPE 35162, SPE Permian Basin Oil & Gas Recovery Conference, Midland, TX (Mar. 27, 1996), pp. 167-176.
Wilson, Robert D., et al., "Bulk Density Logging With High-Energy Gammas Produced by Fast Neutron Reactions with Formation Oxygen Atoms", IEEE Nuclear Science Symposium and Medical Imaging Conference Record, vol. 1 (Oct. 21, 1995), 7 pages.
Zhou, Zhi-Hua et al., "Genetic Algorithm based Selective Neural Network Ensemble", International Joint Conference on Artificial Intelligence, vol. 2, Seattle, WA (2001), pp. 797-802.

* cited by examiner

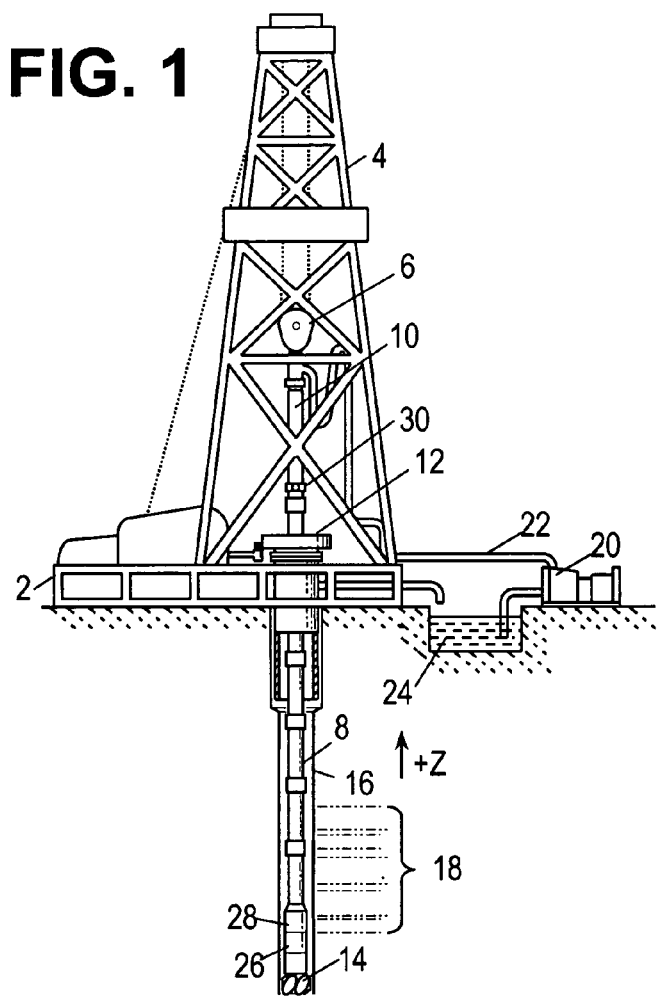
FIG. 1
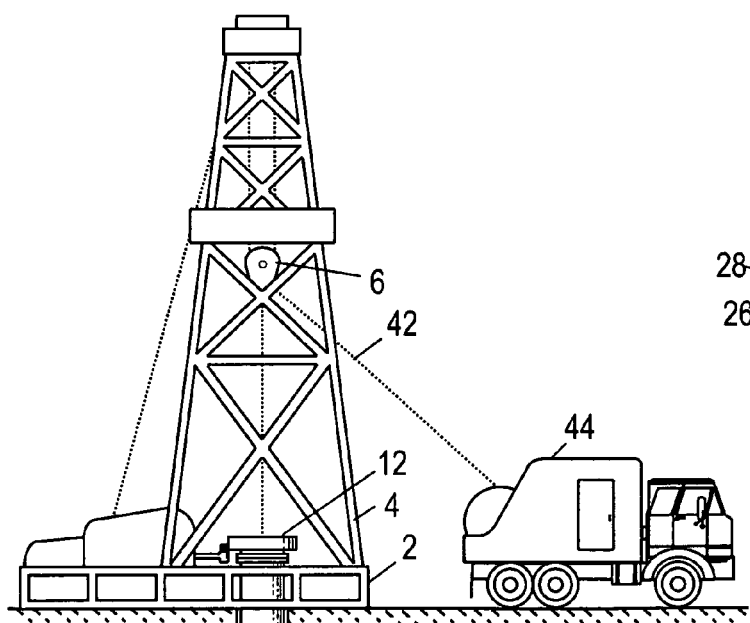
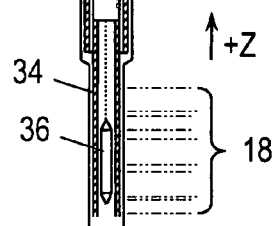
FIG. 2

NEURAL NETWORK BASED WELL LOG SYNTHESIS WITH REDUCED USAGE OF RADIOISOTOPIC SOURCES

CROSS-REFERENCE TO RELATED APPLICATIONS

The present application claims priority to co-pending U.S. patent application Ser. No. 11/165,892, filed Jun. 24, 2005, and entitled "Ensembles of Neural Networks with Different Input Sets" by inventors Dingding Chen, et al.

BACKGROUND

In the quest for hydrocarbon reservoirs, companies employ many data-gathering techniques. The most detailed, albeit localized, data comes from well logging. During the well-drilling process, or shortly thereafter, instruments are passed through the well bore to collect information about the formations through which the well bore passes. The information is traditionally collected in "log" form, i.e., a table or chart of measured data values as a function of instrument position. The most sought-after information relates to the location and accessibility of hydrocarbon gases and fluids.

Resistivity, density, and neutron porosity logs have proven to be particularly useful for determining the location of hydrocarbon gases and fluids. These logs are "open hole" logs, i.e., the log measurements are taken before the formation face is sealed with tubular steel casing. Resistivity can be measured in a number of ways that are not important here. Density is traditionally measured by determining the scattering and absorption of gamma rays emitted from a radioisotopic gamma ray source. Neutron porosity is commonly measured by determining the scattering of neutrons from hydrogen nuclei in the formation. (Neutron porosity is primarily a measure of hydrogen concentration, and hydrogen predominately appears in fluids contained in the formation pores.) Neutron porosity and density measurements may be combined to provide improved estimates of formation porosity.

The neutrons for the porosity measurement are relatively low energy neutrons supplied by a radioisotopic neutron source. As used herein, the term "radioisotopic source" refers to those sources of alpha particles, beta particles, gamma rays, or neutrons, that depend on the natural decay of a radioactive isotope. Cesium 137 is an example of a radioisotopic source that produces beta particles and gamma rays. Americium 241 is an example of a radioisotopic source that produces alpha particles and gamma rays. Another example of a radioisotopic source is the combination of americium 241 with beryllium 9. When the beryllium absorbs an alpha particle from the americium decay, a carbon atom is formed and a neutron is emitted. (Because this radioisotopic source relies on a combination of elements, it is sometimes referred to as a chemical source.) Thus the Am/Be source emits alpha particles, gamma rays, and neutrons. The Am/Be source is primarily used for neutron porosity measurements, but because the neutron interactions with formation nuclei generate secondary gamma rays, the Am/Be source can also be used for density logging measurements that rely on gamma ray attenuation.

Radioisotopic sources present certain risks to human health and they may be a primary ingredient in weapons of terrorism. Even in routine field operations, the involved oilfield workers encounter radiation exposure risks from the use of these sources. When exposed to sufficient radiation from such sources, humans experience cellular damage that can cause cancer and (at higher doses) radiation sickness. These adverse health effects are often lethal. The source materials described above have long half-lives (30 years for cesium 137, and 5300 years for americium 241), meaning that the radiation from these sources will persist for a very long time if they should be accidentally or intentionally dispersed into the environment.

It should come as no surprise, then, to discover that the government heavily regulates the possession and transportation of radioisotopic sources. See, e.g., 10 CFR Part 1-Part 1060 (regulations from the NRC and DOE) and Federal Register vol. 70, no. 44, Jul. 28, 2005 (Proposed rule changes to 10 CFR Parts 20, 32, and 150, concerning the NRC National Source Tracking Database). Such regulations impose considerable costs for establishing and maintaining compliance. Despite such regulations, the authors are given to understand that on average, at least one such radioisotopic source is misplaced or stolen each year. See, e.g., Russell Gold and Robert Block, "Radioactive Material Is Stolen From Halliburton", Mar. 6, 2003 (discussing the theft of a radioisotopic source and the dangers of a dirty bomb).

In addition, extensive safety procedures are needed to protect workers who transport, store, and use radioisotopic sources. Radiation from such sources can produce heat, ionization, and chemical changes which lead to corrosion of storage containers. Regular "wipe" tests are conducted to monitor sources for leakage, radiation sensors are put into storage facilities to monitor radiation levels, and employees are given radiation-sensitive badges to monitor employee exposure levels. Cumulatively, the tests, monitoring equipment, transportation, and storage facilities present a severe budgetary impact to any company that employs such sources.

Moreover, when compliance efforts are combined with necessary safety procedures, the result is a considerable effort and delay in getting a radioisotopic source to the location in the field where it is needed. To further compound the problem, the preferred radioisotopic sources are in short supply. The largest supplier of americium 241 was the US Department of Energy, which had accumulated a stockpile of this material from various refining operations on other radioactive materials. These stockpiles have now been exhausted, and currently the only continuing source of this material is an aging breeder reactor in eastern Europe.

BRIEF DESCRIPTION OF THE DRAWINGS

An understanding of the disclosed embodiments can be obtained when the following detailed description is considered in conjunction with the following drawings, in which:

FIG. 1 is an illustrative view of a logging-while-drilling (LWD) environment;

FIG. 2 is an illustrative view of a wireline logging environment;

Figure 3:
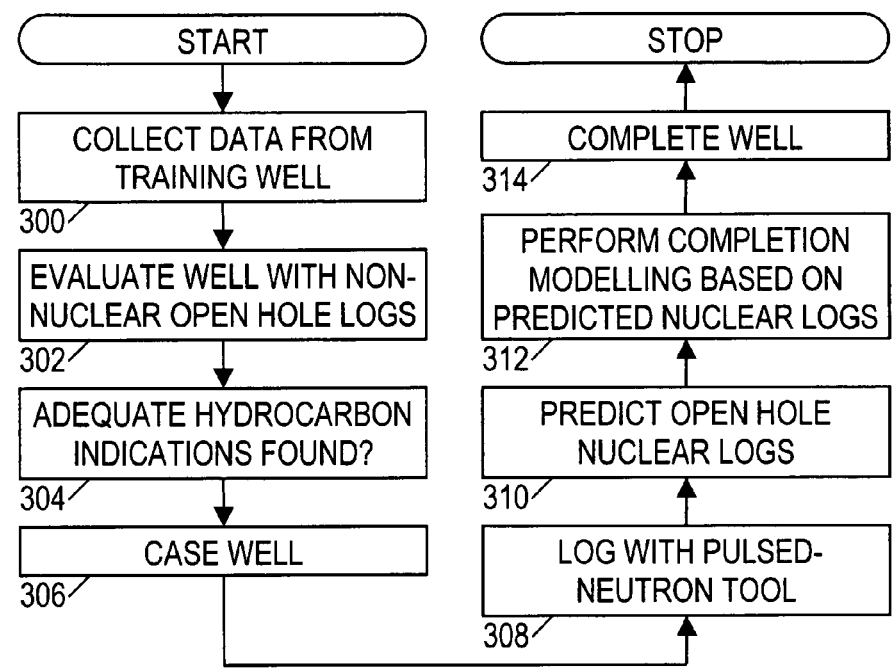
FIG. 3 is a flowchart of an illustrative logging method having reduced usage of radioisotopic sources.

While the invention is susceptible to various modifications and alternative forms, specific embodiments thereof are shown by way of example in the drawings and will herein be described in detail. It should be understood, however, that the drawings and detailed description thereof are not intended to limit the invention to the particular form disclosed, but on the contrary, the intention is to cover all modifications, equivalents and alternatives falling within the spirit and scope of the present invention as defined by the appended claims.

DETAILED DESCRIPTION

The problems outlined in the background are in large part addressed by logging and well completion methods as disclosed herein. In various embodiments, the disclosed methods provide accurate density and/or neutron porosity logs while minimizing radioisotopic source usage. In at least some cases, the density and neutron porosity logs obtained are more accurate than would be expected from radioisotopic source measurements, particularly measurements with radioisotopic sources in a logging-while-drilling (LWD) environment.

FIG. 1 shows an illustrative environment for drilling a well. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a well bore 16 that passes through various formations 18. A pump 20 circulates drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the well bore into the pit 24.

One or more LWD instruments are integrated into a logging tool 26 located near the bit 14. As the bit extends the well bore through the formations, logging tool 26 collects measurements relating to various formation properties as well as the bit position and various other drilling conditions. The logging tool 26 may take the form of a drill collar, i.e., a thick-walled tubular that provides weight and rigidity to aid the drilling process. A telemetry sub 28 may be included to transfer tool measurements to a surface receiver 30 and to receive commands from the surface receiver.

Once a well has been drilled, the well bore 16 may be lined with casing 34 as shown in FIG. 2 to preserve the integrity of the hole and to prevent fluid loss into porous formations along the borehole path. Typically, the casing is permanently cemented into place to maximize the borehole's longevity and to prevent unwanted fluid communication between formations. Subsequent logging operations may be conducted using a wireline logging tool 36, i.e., a sensing instrument sonde suspended by a cable 42 having conductors for transporting power to the tool and telemetry from the tool to the surface. A logging facility 44 collects measurements from the logging tool 36, and typically includes computing facilities for processing and storing the measurements gathered by the logging tool.

Wireline logging tool 36 may include one or more logging tools such as a pulsed neutron capture (PNC) tool. PNC tools operate by accelerating deuterium ions at a target that includes tritium and possibly deuterium. At sufficiently high energies, the nuclei will fuse, producing a helium atom that promptly ejects a high-energy neutron. The high energy neutrons travel into the surrounding formation where they impact formation nuclei. Often the neutrons are captured, causing "capture" gamma rays to be emitted. Alternatively, the high energy neutrons scatter from the nuclei inelastically, causing "inelastic" gamma rays to be emitted.

In any event, the energy spectrum and/or decay rate of the emitted gamma rays can be measured and analyzed to identify carbon/oxygen ratios (using the inelastic gamma rays) or formation capture cross-sections (using the capture gamma rays). In combination with measurements from radioisotopic source tools, the PNC tool measurements are indicative of oil or water saturation in the formation.

The logging information is intended to characterize formations 18 so as to locate reservoirs of oil, gas, or other underground fluids, and so as to provide data for use in field correlation studies and to assist in seismic data interpretation. Whenever possible, logging is performed in uncased ("open hole") conditions because the logging tool can achieve closer contact with the formation and because some of the desired open hole measurements are adversely affected by the casing and/or cement in a cased borehole. However, the open hole logging environment is somewhat more hostile than the cased hole environment, since the well bore has less integrity.

Tools are often trapped downhole by collapsing well bore walls. In the case of radioisotopic source tools, the trapping of a tool poses particular cause for concern. If it can be shown that the tool poses no risk of water reservoir contamination, the services company may choose to cement the well bore closed to prevent any possibility of the tool being recovered by malicious parties and to avoid radiation exposure risks to people near the well site. (Unlike other trapped tools where recovery or clearing operations can break a tool into pieces without significant risk to personnel, radioisotopic tools must be retrieved whole to prevent possible scattering of radioisotopic materials.)

In view of the supply shortage and the various risks posed by use of radioisotopic sources, it is desirable to reduce their usage in well bore logging. However, the neutron porosity and density measurements provided by such tools are particularly desirable to have. The vast majority of development wells are being drilled in areas where a mature understanding of the basin geology has been established. In such circumstances, radioisotopic sources may be used in a limited number of training wells to set a baseline from which synthetic density and/or neutron porosity logs may be generated.

FIG. 3 is a flowchart of an illustrative method for logging and completing a well with reduced usage of radioisotopic sources. Beginning with block 300, training well data is collected. The collected data includes the desired neutron porosity and density logs derived from measurements by radioisotopic sources, along with various cased and open hole logs from tools without a radioisotopic source (e.g., logs of PNC tool measurements, resistivity measurements, sonic measurements, nuclear magnetic resonance measurements, etc.). Training well data needs only to be collected from one (or at most a few) wells in a given field. Thereafter, the radioisotopic source tools can eliminated, and all additional development wells can be logged without use of radioisotopic sources. In some method embodiments, the radioisotopic logs obtained from the training well(s) are wireline logs (which are generally conceded to be more accurate than the corresponding LWD logs), even though the logs being synthesized are radioisotopic logs that would otherwise have been collected by an LWD tool.

In block 302, a subsequent well is logged by tools not having radioisotopic sources. The logging may be done during the drilling process by LWD tools, or open hole logs may be gathered using wireline tools. The logs that may be collected include resistivity logs, natural gamma ray logs, induced gamma ray spectroscopy logs, sonic logs, nuclear magnetic resonance (NMR) logs, spontaneous potential logs, drilling parameters (such as weight on bit, torque on bit, rate of penetration), and mud or core logging data.

In block 304 a determination is made as to whether the logs from block 302 are indicative of the presence of sufficient hydrocarbons to justify completing the well. For example, sonic logs may provide the basis for porosity estimates, while a resistivity log provides a basis for distinguishing ground water from hydrocarbons. An indication of hydrocarbons in areas of sufficient porosity may serve as a basis for determining that a well completion is justified.

If justified, the well is cased in block 306. In block 308, logging with a pulsed neutron tool is performed if not previously performed before the casing of the well. (Where such technology is available, the pulsed neutron tool may be placed in the drill string as a LWD sensor. In block 310, the logs from the pulsed neutron log and the non-radioisotopic open hole logs are used to predict the neutron porosity and density logs that would have been measured by tools having radioisotopic sources. Such prediction may be deterministic or may rely on neural networks and/or genetic algorithms developed using log information from the training well(s). With a properly trained and configured neural network ensemble, the predicted logs in some cases may be expected to have a higher resolution and accuracy than what could actually be measured by a tool with a radioisotopic source, due to the higher resolution of various input logs, and their increased depth of investigation relative to the radioisotopic source tool logs. In the LWD situation, the simulated nuclear logs are potentially more accurate than the actual LWD logs since it is well known that LWD logs suffer from inaccuracies due to the motion and vibration of the downhole assembly housing the neutron porosity and density sensors. Wireline based PNC logs, when used in generating the simulated logs, will not be subjected to the drilling-motion related sources of error.

In block 312, the predicted logs of neutron porosity and density, in conjunction with various other logs, are used to accurately locate producible hydrocarbons, to estimate the producibility of those hydrocarbons, to provide information for subsequent use in well-to-well correlations, to furnish information used in interpreting seismic data, and to evaluate the effect of various completion configurations. In block 314, the casing is perforated in selected positions to complete the well in accordance with the optimum completion configuration.

Figure 4:
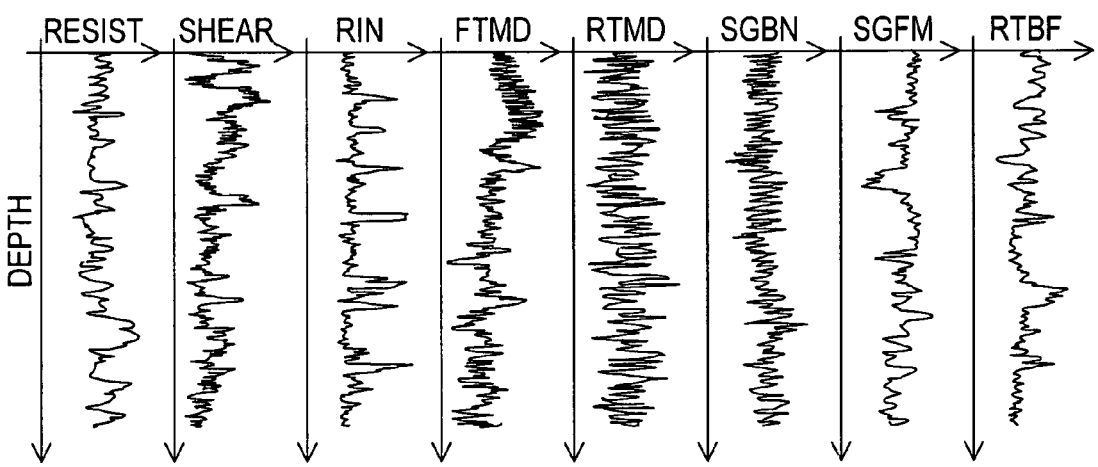
FIG. 4 shows illustrative logs derived from tools without a radioisotopic source.

FIG. 4 shows illustrative open- and cased-hole logs that may be derived from measurements by logging tools without a radioisotopic source. As shown, the logs are a plot of the measured value as a function of depth. Alternatively, such logs may be plotted as a function of time or a function of position in along the borehole. The logs shown are an open hole resistivity log (RESIST), an open hole shear wave velocity log (SHEAR), and various logs measured by a PNC tool:

FTMD—log of overall capture gamma ray count rate for far detector;

RTMD—log of capture gamma ray count rate ratio between detectors;

RIN—log of inelastic gamma ray count rate ratio between detectors;

SGBN—log of cross section (sigma) for borehole (near detector);

SGFM—log of cross section (sigma) for formation (far and/or near detector); and

RTBF—log of the ratio of capture count rates from the borehole relative to capture count rates from the formation.

Other useful PNC tool logs that are not shown in the figure include:

NTMD—log of overall capture gamma ray count rate for near detector; and

GR—log of natural gamma ray count rate.

The foregoing lists are in no way exhaustive. Other potential cased hole logging tools and log measurements exist, and may be collected and employed in the synthetic log generation process if these measurements were not collected during open hole logging. Pulsed neutron logging tools may be replaced with or supplemented by other cased hole tools, e.g., sonic logging tools (full wave or conventional compressional or shear logs), natural gamma ray spectroscopy tools, cased hole resistivity logging tools, cement bond logs, and production logging tools. Any of these may be analyzed using the normal facies workflow to identify formation conditions and find zone and curve sets with specific attributes flagged. The input logs can then be partitioned on a zone or attribute basis for analysis of data from similar environments. In any event, the list of input signal candidates is based on the particular application at hand.

Figure 5:
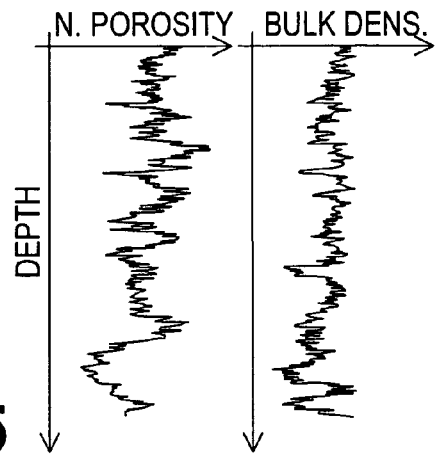
FIG. 5 shows illustrative neutron porosity and density logs typically derived from logging tools with radioisotopic sources.

FIG. 5 shows illustrative neutron porosity and density logs derived from measurements by a tool with a radioisotopic source. To generate such logs from measurements by tools without radioisotopic sources, it is desirable to convert non-radioisotopic source tool logs into synthetic approximations of radioisotopic source tool logs.

Figure 6:
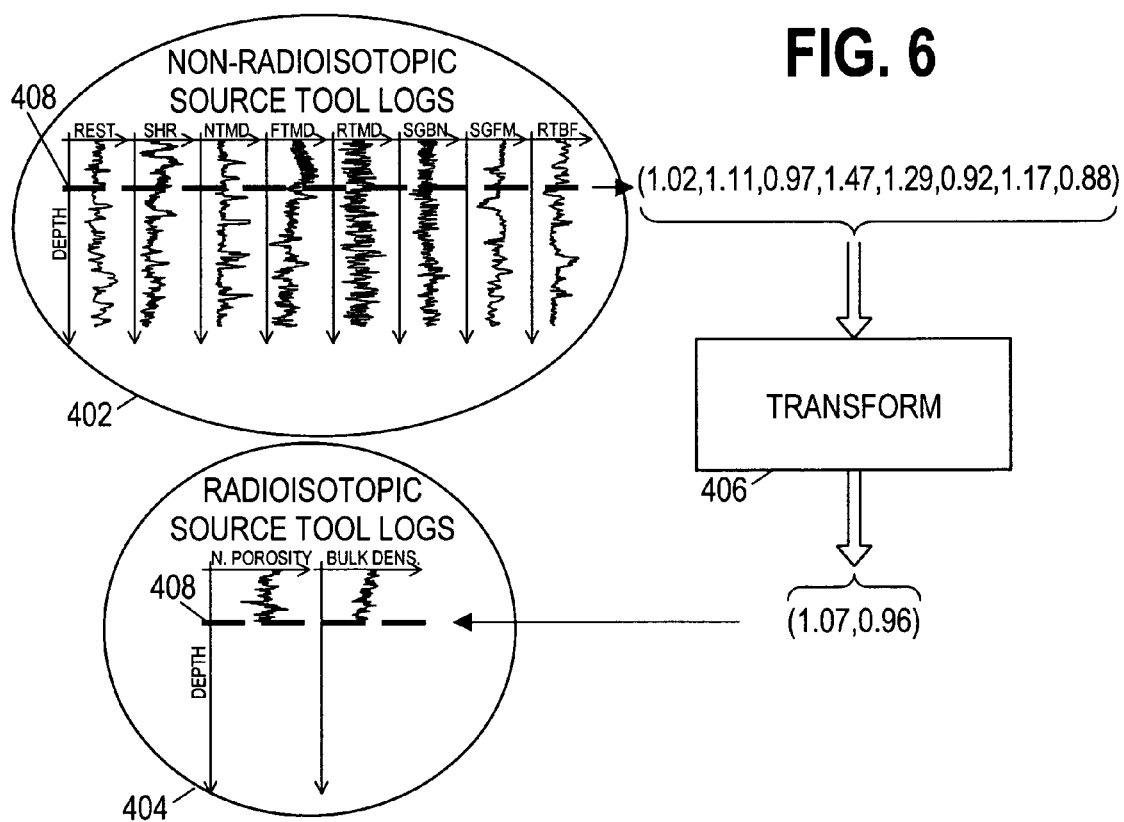
FIG. 6 shows an illustrative transform process for predicting neutron porosity and density logs from logs of tools without a radioisotopic source.

FIG. 6 shows an illustrative transformation process 406 that converts non-radioisotopic source tool logs 402 into synthetic radioisotopic source tool logs 404. The input values to transform block 406 are those non-radioisotopic source tool log values at a given depth 408. For this set of input values, transform block 406 produces a set of output values that are the synthetic radioisotopic source tool log values at the given depth 408. The radioisotopic source tool logs across the entire depth interval can thus be simulated by repeating the conversion at each depth covered by the non-radioisotopic source tool logs.

Transform block 406 may employ neural networks and/or genetic algorithms to perform the conversion. Because the amount of training data is limited relative to the desired operating scope, the transform block 406 may employ multiple neural networks that are combined in an ensemble to provide more robust behavior both within and outside the training region.

Figure 7:
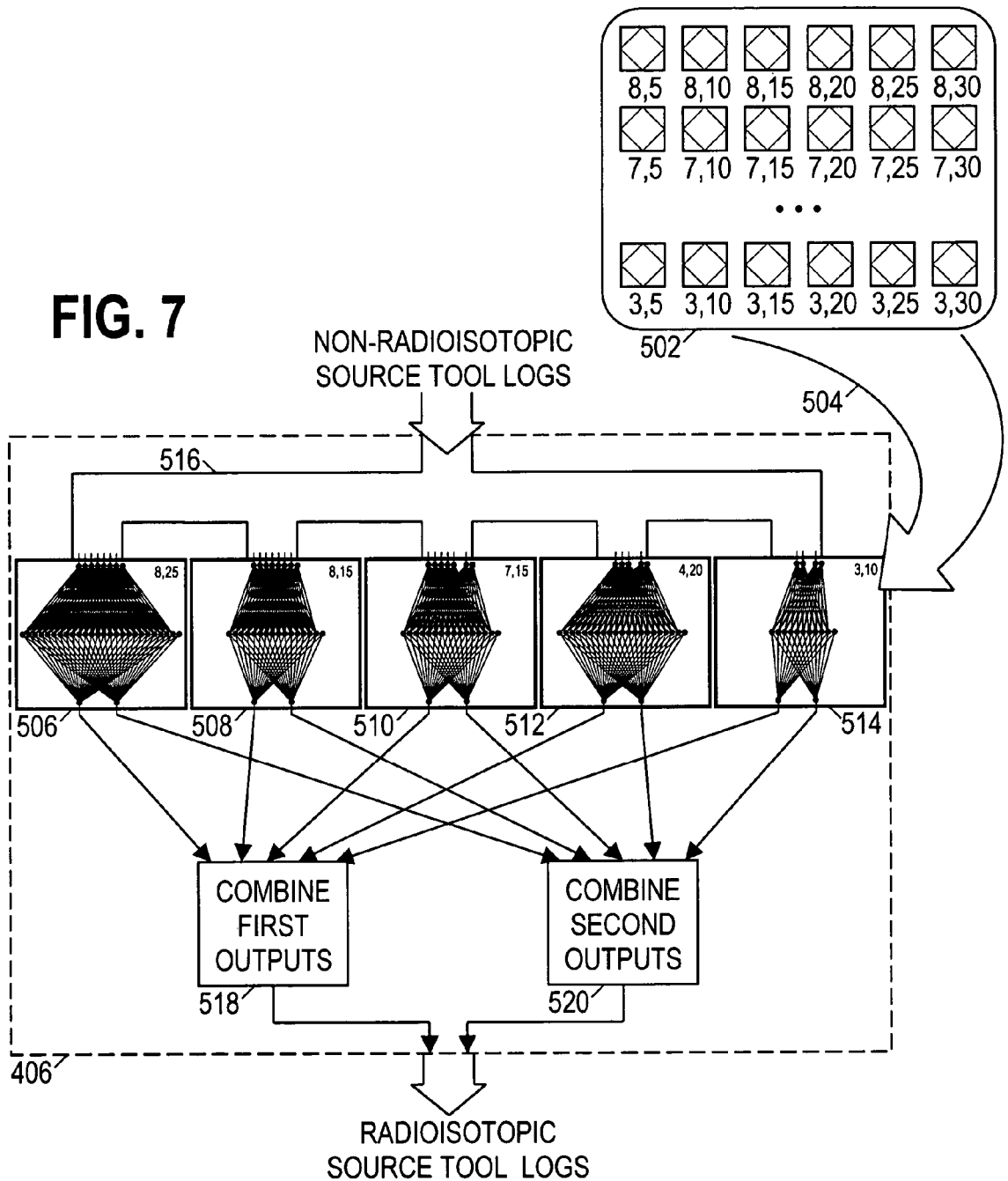
FIG. 7 shows an illustrative neural network ensemble.

FIG. 7 shows an illustrative pool of trained neural networks 502. The neural networks in the pool are diverse in at least one respect, e.g., some of the networks may operate on different subsets of the available input signals. For example, one neural network in the pool may operate on a subset of three input signals such as RIN, RTMD, and SGFM, while another neural network operates on a subset of five input signals such as GR, SHEAR, RIN, RTMD, and SGFM. The subsets can be disjoint or they can overlap, but experience has shown that input set diversity significantly improves the performance of transform block 406. In some preferred embodiments, the smaller subsets are always contained in the larger subsets.

In addition to being diverse in the input signals upon which they operate, the neural networks may also be diverse in other ways. For example, when the neural networks are based on a back-propagation architecture (back-propagation networks, or "BPN"), one of the architectural parameters is the number of nodes in the hidden layer. (Details regarding BPN design are widespread in the literature. See, e.g., J. A. Freeman and D. M. Skapura, *Neural Networks*, © 1991 by Addison Wesley, Chapter 3.) In some embodiments, the pool of neural networks is diverse in the number of nodes in the hidden layer. For example, each of the neural networks shown in pool 502 is accompanied by an ordered pair indicating the size of the input signal set and the number of nodes in the hidden layer (so 3,10 indicates three input signals and ten hidden nodes). Other ways to construct a pool of diverse neural networks includes: training different networks on different training data sets; training different networks on differently partitioned training data sets; training from different initial states; using different neuron functions; using different training algorithms; and/or using different architectural parameters where available.

Given a range of diverse neural networks, each network is trained in accordance with the appropriate training algorithm to obtain pool 502. A selection process 504 (possibly employing a genetic algorithm) is then applied to the neural networks in the pool to assemble an optimized neural network ensemble. The transform block 406 shown in FIG. 5 comprises five neural networks 506, 508, 510, 512, and 514, drawn from pool 502. Neural network 506 operates on all eight available input signals and has 25 nodes in the hidden layer. Neural network 508 operates on all eight available input signals and has 15 nodes in the hidden layer. Neural network 510 operates on all available inputs except SGBN and has a 15 node hidden layer. Neural network 512 operates on the NTMD, RIN, RTMD, and SGFM input signals, and has a 20 node hidden layer. Finally, neural network 514 operates on the RIN, RTMD, and SGFM input signals, and has a 10 node hidden layer.

Each of the neural networks has been trained to produce two outputs, each output corresponding to one of the radioisotopic source tool logs (density and neutron porosity). For each radioisotopic source tool log, a corresponding output unit 518, 520 averages the corresponding output signal from the five neural networks to produce the corresponding synthetic radioisotopic source tool log. In some embodiments, the output units do a straight averaging operation, while alternative embodiments perform a weighted averaging operation.

In alternative embodiments, each neural network is trained to produce a single output, with different networks being trained to produce different synthetic radioisotopic source tool logs. The outputs of those networks trained for a given radioisotopic source tool log are combined to synthesize that radioisotopic source tool log. In yet other ensemble embodiments, multiple-output neural networks are combined with single-output neural networks. In such embodiments, each output unit is associated with a single radioisotopic source tool log and accordingly combines only those neural network outputs that have been trained to predict that radioisotopic source tool log.

Neural network ensemble architectures such as that described above, when constructed using an appropriate pool (such as one constructed in accordance with the method described below with respect to FIG. 8) and an appropriate selection process 504 (such as that described below with respect to FIG. 9), have proven to perform better at predicting radioisotopic source tool logs than even the best-trained individual networks. The diversity of the component networks provide for a more robust prediction outside the training regions applied to the individual networks.

Figure 8:
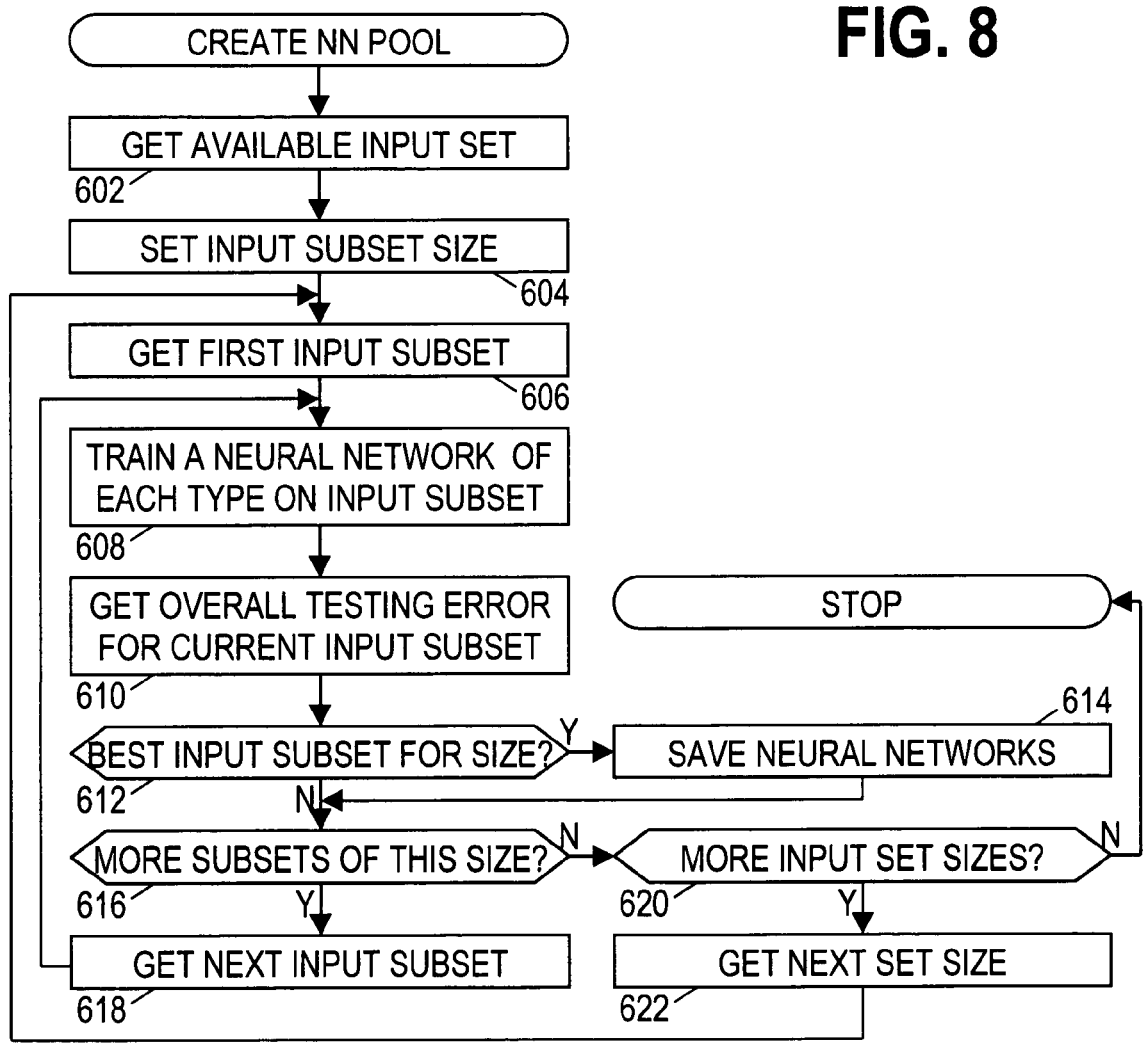
FIG. 8 shows an illustrative method of creating a pool of trained neural networks.

FIG. 8 shows an illustrative process for creating a pool of trained neural networks having a diversity of input signal sets. In block 602, the process begins with a determination of the available input signals. For example, at least eight non-radioisotopic source tool logs are available from information gathered by a PNC logging tool. As another example, the available input signals include the non-radioisotopic source tool logs derived from a combination of logging tools so that, e.g., the available signals include PNC logs and one or more of the following: shear and/or compressional sonic logs, resistivity logs, nuclear magnetic resonance logs, gamma ray spectroscopy logs (natural or induced), and production logs. In block 604, an input subset size is chosen. In some embodiments, the input subset size begins at one. In some alternative embodiments, the input subset size starts off equal to a user-specified number. In some embodiments, the initial input subset is also user-specified. In all cases, the same logs from the training well are used to train the neural networks as the logs that will be available in the subsequent well(s) where it is desired to eliminate the radioisotopic sources. Also, it may be advantageous (but not mandatory) to have the logs collected in the training well under the same casing conditions (i.e., open hole vs. cased hole) as the corresponding logs obtained in the subsequent wells.

Blocks 606-622 form a loop that is performed for each input subset size from the starting size to the maximum size (the number of available input signals). An inner loop, comprising blocks 608-618, is performed for each candidate input subset of the given size. The order in which the input subsets of a given size are considered is unimportant. In some embodiments, however, restrictions are placed on which input subsets of a given size are considered. For example, in some embodiments the candidate subsets of a given size include the "best" subset of the next-smaller size ("stepwise selection"). In some alternative embodiments, the direction is reversed, and the candidate input subsets are only those proper subsets of the "best" input subset of the next larger size ("reverse stepwise selection"). In yet other alternative embodiments, an exhaustive processing of all subsets of a given size is performed for each input subset size ("exhaustive search"). In still other alternative embodiments, a genetic algorithm is used as a fast approximation of the exhaustive processing alternative ("genetic input selection") when a large number of candidate inputs are available.

In block 606, a first input subset of the given size is chosen. In the first iteration of outer loop 606-622 (e.g., when the size equals 1), the candidate input subsets may be expressed as an exhaustive list of all subsets of that size that can be made from the set of available input signals. In subsequent iterations of the outer loop, the candidate input subsets may be restricted to only those subsets that include the subset determined to be best in the preceding loop iteration, i.e., stepwise selection. Thus, for example, if the first outer loop iteration determines that the best input subset of size 1 is {SGFM}, then in the second iteration of the outer loop, the candidate input subsets in some embodiments are restricted to input subsets of size 2 that include SGFM. The order in which the candidate subsets are considered is unimportant.

In block 608, one or more neural networks are trained. In those embodiments where diversity beyond input set diversity is desired, multiple neural networks are trained in block 608. For example, pool 502 (FIG. 7) included neural networks having between 5 and 30 hidden nodes. One network having each number of hidden nodes is trained in block 608 using any standard training algorithm, each network optionally being trained with a different partition of the log data. (In other words, the log data may be partitioned into training, validation, and testing data sets in multiple ways, with a different way being used for each neural network). The wells used for deriving training, validation, and testing data are called training wells. The training wells have been logged before and after being cased. In some embodiments, at least two training wells are used, with radioisotopic source tool and non-radioisotopic source tool logs from one well (the "testing well") being reserved for later validity testing. Alternatively, the data from all wells is partitioned into training, validation, and testing sets.

The percentage of data in the training, validation, and testing sets can be varied. In some embodiments, eighty percent of each non-radioisotopic source tool log and corresponding parts of the radioisotopic source tool logs are applied in a standard BPN training algorithm. Ten percent of the data from the test wells is used for validation, i.e., for early training termination if performance fails to converge. Finally, ten percent of the test well data is withheld from training for testing performance in block 610. This percentage breakdown is abbreviated as 80/10/10. Other percentage breakdowns that have yielded success are 60/15/25 and 70/10/20. These percentages are subject to change depending on the training situation.

In block 610, an overall error measurement is determined for the current input subset. In some embodiments, the overall error is based on per-network measure of squared error between predicted radioisotopic source tool logs and actual radioisotopic source tool logs. In these embodiments, the overall error is the mean of the per-network measures for the current input subset. In alternative embodiments, the performance is measured with different error functions.

In block 612, a test is made to see if the overall error for the current input subset is smaller than that of previous input subsets of the same size. If so, then in block 614, the neural networks trained for the current set of input signals are saved as the current "best". In block 616, a test is made to see if there are any more candidate subsets of the current size. If so, then in block 618, the next input subset is determined and another iteration of inner loop 608-618 is performed. Otherwise, in block 620, a test is made to see if there are any more input set sizes. If so, in block 622, the input set size is incremented, and another iteration of outer loop 606-622 is performed. If not, the process halts.

At the end of the illustrative process of FIG. 8, the neural networks for the "best" input sets of each size have been stored. These neural networks are "locally ranked", i.e., the neural networks are the best neural networks with specified sizes. In some alternative embodiments, blocks 612 and 614 may be replaced with a storing operation to save all trained neural networks from block 608 with their respective testing errors from block 610. These neural networks are "globally ranked" after all experimental input subsets are tested. Since some better-performing networks may have different input subsets of a given size, the use of globally ranked neural networks will assure that none of the promising candidates are discarded.

In addition to stepwise selection, locally ranked and globally ranked neural networks can be determined using other search techniques including reverse stepwise selection, exhaustive search, and genetic input selection. Whether locally or globally ranked, the stored neural networks are used as a starting point for a selection process 504.

Figure 9:
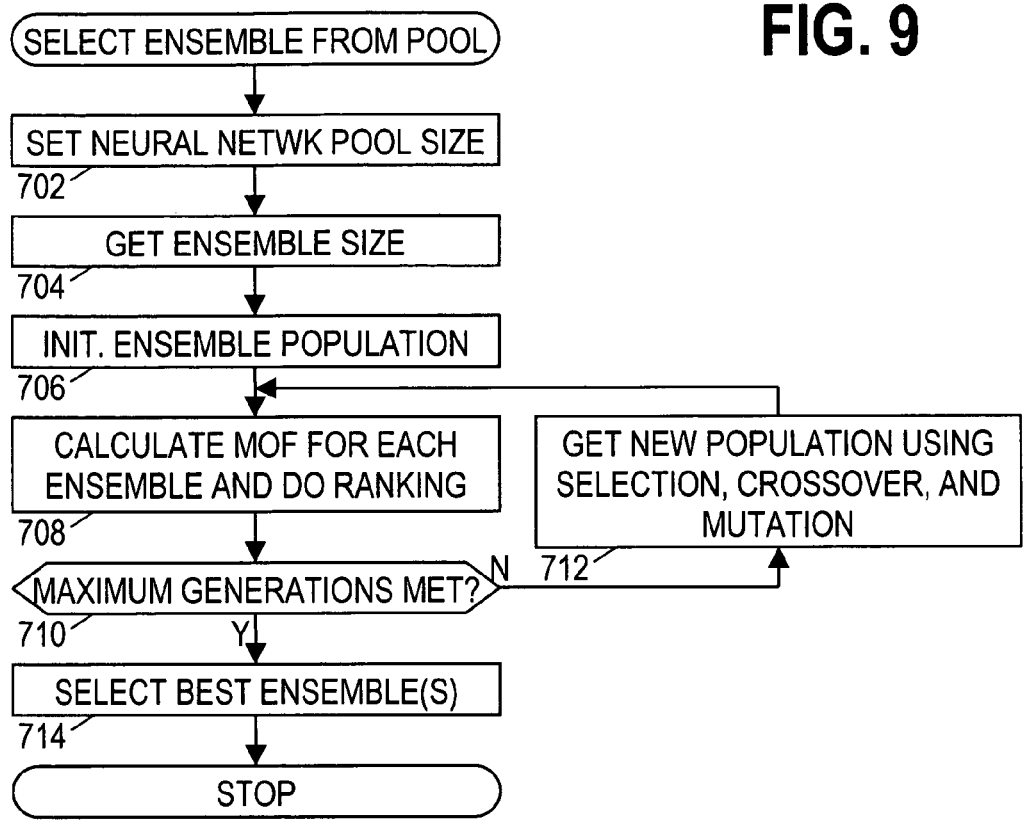
FIG. 9 shows an illustrative method of creating a neural network ensemble.

FIG. 9 shows an illustrative selection process to construct and optimize a neural network ensemble. Beginning with block 702, a pool size is determined. For this illustrative selection process, the pool size is $2^n$, with n being 5, 6 or 7. Other pool sizes can be used. The pool size is set based on a trade-off between wanting to assure sufficient diversity in the pool and wanting to limit the pool to neural networks with acceptable individual performances. When using a locally ranked neural network set, sufficient diversity is available with a smaller pool size, whereas for globally ranked neural networks, larger pool sizes are desirable. In some process embodiments, the pool size is set by first finding the minimum testing error from the set of stored neural networks with the best single set of inputs. A threshold is then calculated by multiplying the minimum testing error by a scale factor in the range of, for example, about 1.1 to 1.5. The number of stored neural networks having a testing error (as a function of input subsets) below this threshold is determined, and the pool size is set to be the power of two that is larger than or equal to this number. The pool is then formed from the best-performing stored neural networks with different input subsets.

In block 704, the selection process determines the number of neural networks that will be used to construct an ensemble. This is a programmable number to be set by the user, but it is expected that to obtain the benefits of using an ensemble without incurring an excessive computational load, the number will be in the range from three to ten neural networks, with five being a default.

Given the pool and the ensemble size, different selection processes may be used to obtain and optimize the neural network ensemble. For example, the selection process may simply be selecting those networks with the best performance. In the embodiments illustrated by FIG. 9, the selection process is that described in U.S. patent application Ser. No. 10/811,403, filed Mar. 26, 2004, and entitled "Genetic Algorithm Based Selection of Neural Network Ensemble for Processing Well Logging Data".

In block 706, an initial, randomly constructed population of ensembles is determined. The population size is set by the user and may be, e.g., 50 neural network ensembles. In block 708, a fitness value is determined for each neural network ensemble. In the above-referenced application, the fitness value is calculated in accordance with a multi-objective function ("MOF"), e.g., a weighted sum of: a performance measure, a complexity measure, and a negative correlation measure. Weights of each of these three components can vary in the range zero to one, with the sum of the weights equaling one. The performance measure is a mean of squared error between predicted open hole logs and actual open hole logs. The complexity measure is a sum of squared weights in the ensemble. The negative correlation measure is the average of individual negative correlation measures for the neural networks in the ensemble over multiple outputs and data samples. The individual measure of each output for a given sample is determined by finding (1) a difference between the individual neural network's output and the average neural network output of the ensemble; (2) a sum of such differences for all other neural networks in the ensemble; and (3) the product of (1) and (2). Further details can be found in the above-referenced application.

In block 710, the number of loop iterations (generations) is compared to a threshold. If the maximum number of generations is not met, then in block 712 a new population is determined. The new population is determined using genetic algorithm techniques such as removing those population members with the worst fitness values from the population, "breeding" new ensembles by combining neural networks from remaining ensembles, introducing "mutations" by randomly replacing one or more neural networks in selected ensembles, and "immigrating" new ensembles of randomly-selected neural networks.

Once the maximum number of generations is met, an ensemble is selected from the population in block 714. In some embodiments, the selected ensemble is the ensemble with the best fitness measure. In other embodiments, validity testing is performed and the selected ensemble is the ensemble with the best performance measure. Typically, after validity testing, the ensemble may be deployed for general use with similar formation conditions for converting from non-radioisotopic source tool logs to synthetic radioisotopic source tool logs. In other embodiments, the training and selection processes are deployed as parts of a software package for determining customized ensembles for log conversion.

It is desirable (but not mandatory) to have complete data from at least two training wells with similar formation conditions. In some embodiments, the data from one well is reserved for ensemble validity testing. In other words, the rest of the data is used for input subset selection, candidate neural network generation, and ensemble optimization (in the multi-objective function). Other embodiments use the data from one well for input subset selection and candidate neural network generation. The data from the first and second wells is then combined, with part of the combined data being used for ensemble optimization, and the remainder of the combined data being used for ensemble validity testing. In yet other embodiments, the data from one well is used for input subset selection and candidate neural network generation. The data from the second well is used for ensemble optimization, then a combined set of data is used for ensemble validity testing. In still other embodiments, part of the combined data set is used for input subset selection, candidate neural network generation, and ensemble optimization. The remainder of the combined data set is then used for ensemble validity testing.

Figure 10:
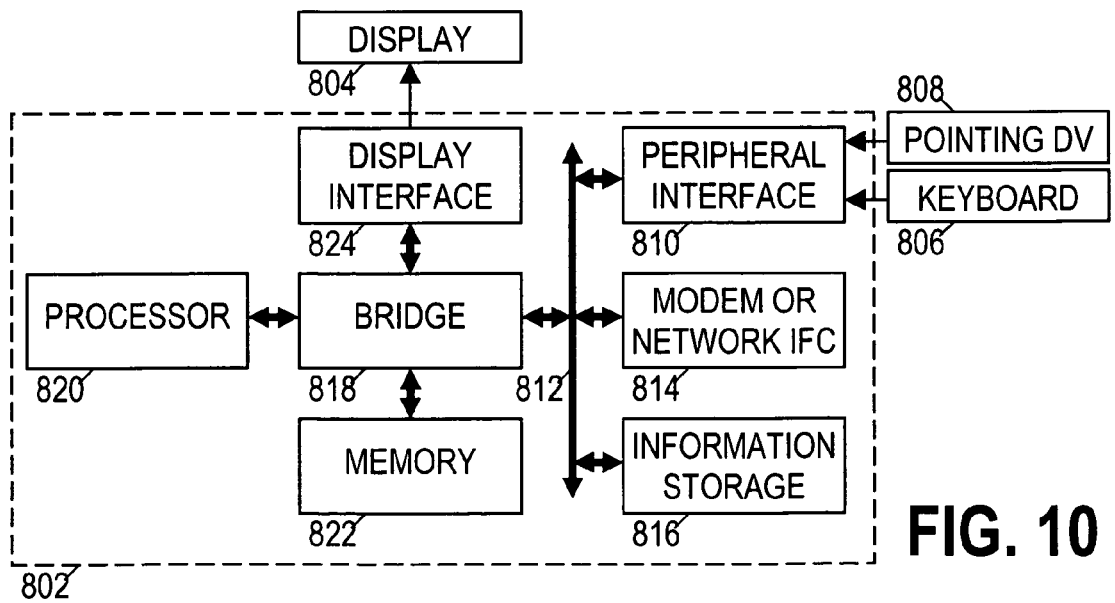
FIG. 10 shows an illustrative block diagram of a computer for implementing methods disclosed herein.

The process may be implemented as software in a general purpose desktop computer or in a high-performance server. FIG. 10 shows a simplified functional block diagram of a desktop computer 802. The computer 802 couples to a display 804 and one or more input devices such as a keyboard 806 and a pointing device 808. Software running on computer 802 configures the computer to interact with a user via the input devices and display. Information carrier media such as internal storage devices, portable disks or other storage devices, and network connections, can make such software available for execution by the computer.

Input devices 806, 808 are coupled to a peripheral interface 810 that accepts input signals and converts them into a form suitable for communications on internal bus 812. Bus 812 couples peripheral interface 810, a modem or network interface 814, and an internal storage device 816 to a bus bridge 818. Bridge 818 provides high bandwidth communications between the bus 812, a processor 820, system memory 822, and a display interface 824. Display interface 824 transforms information from processor 820 into an electrical format suitable for use by display 804.

Processor 820 gathers information from other system elements, including input data from peripheral interface 810 and program instructions and other data from memory 822, information storage device 816, or from a remote location via network interface 814. Processor 820 carries out the program instructions and processes the data accordingly. The program instructions can further configure processor 820 to send data to other system elements, including information for the user which can be communicated via the display interface 824 and the display 804.

Processor 820, and hence computer 802 as a whole, typically operates in accordance with one or more programs stored on information storage device 816. Processor 820 copies portions of the programs into memory 222 for faster access, and can switch between programs or carry out additional programs in response to user actuation of the input device. The methods disclosed herein can take the form of one or more programs executing in computer 802. Thus computer 802 can carry out the information gathering processes described with respect to FIGS. 1-5, the neural network pool creation processes described with respect to FIG. 8, the selection processes described with respect to FIG. 9, and the transformation processes described with respect to FIG. 6-7.

Figure 11:
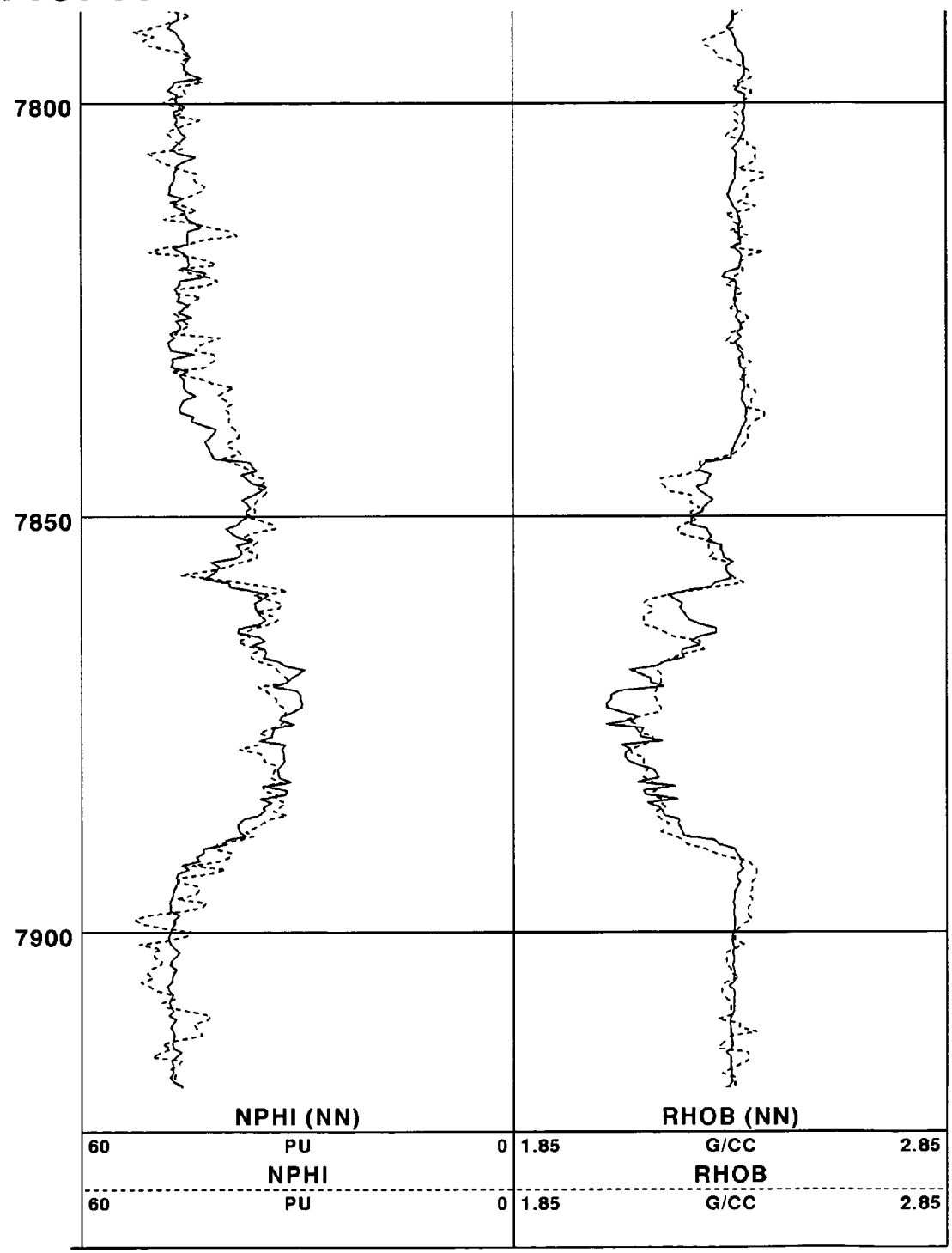
FIG. 11 compares illustrative radioisotopic source tool logs to illustrative predicted logs in a "gas sand" formation.

FIG. 11 compares illustrative radioisotopic source tool logs to illustrative predicted logs in a borehole penetrating a "gas sand" formation. The neutron porosity (NPHI) and density (RHOB) logs are shown as a function of depth, with the predicted logs shown as solid lines and the measured logs shown as broken lines. The predicted and measured logs are observed to have a close agreement, showing the feasibility of the various disclosed method embodiments.

Figure 12:
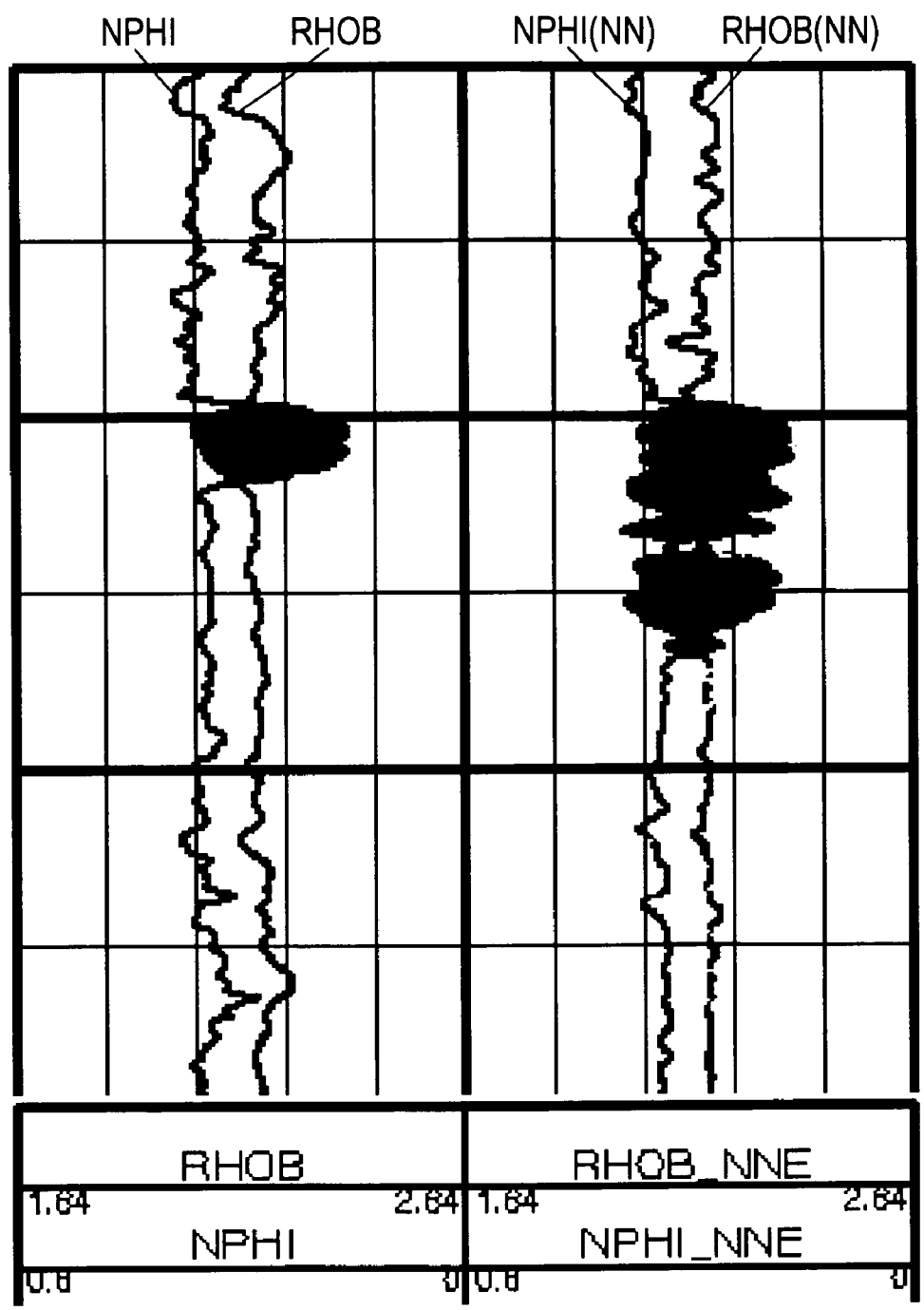
FIG. 12 illustrates the use of predicted logs to track reservoir evolution.

FIG. 12 shows two overlay plots, in which the density plot (increasing from left to right) is overlaid on the neutron porosity plot (increasing from right to left). Where the density decreases and the neutron porosity decreases enough that the graphs "cross over" (the darkly-shaded regions), one may expect to find a gas-bearing interval. (Recall that neutron porosity is indicative of hydrogen concentration. Lower hydrogen concentrations are associated with gas-bearing intervals.) The overlay plot on the left side of FIG. 12 shows a "before" picture as measured by a radioisotopic source tool, while the overlay plot on the right side of FIG. 12 shows an "after" picture as given by synthetic neutron porosity and density logs derived from measurements taken several years after the original logs. The "after" picture shows a significant expansion of the gas cap (which has been confirmed by formation cross section measurements from the PNC tool), illustrating the utility of the synthetic logs for monitoring changes to hydrocarbon reservoirs.

The methods disclosed above may provide more accurate neutron porosity and density log data in LWD applications than could be made using LWD radioisotopic sources. LWD radioisotopic source tools are sensitive to standoff (the distance from the face of the tool to the well bore wall) and tool motion. However, pulsed neutron tools offer deeper investigation depths and are insensitive to standoff variations, making it possible for the porosity and density logs to be more accurate than measurements made by a radioisotopic source tool.

Numerous variations and modifications will become apparent to those skilled in the art once the above disclosure is fully appreciated. For example, the neural network ensemble may be configured to generate additional synthetic logs for comparison to actual logs. In one embodiment, the neural network ensemble generates synthetic neutron porosity, density, resistivity, and caliper logs. The resistivity and caliper logs are compared to actual resistivity and caliper logs as a measure of synthetic log quality control. As another example, the present disclosure focuses on the reduction of radioisotopic source usage in LWD operations, but the same principles can be applied to reduce radioisotopic source usage in open hole wireline logging operations. It is intended that the following claims be interpreted to embrace all such variations and modifications.

What is claimed is:

1. A computer-implemented method for synthesizing one or more well logs, the method comprising:

collecting at least one output log of a first well bore from measurements with a radioisotopic source;

collecting at least one input log of the first well bore from measurements by a non-radioisotopic logging tool;

training a neural network via a computer to predict the output log from the at least one input log;

collecting at least one input log of a second well bore from measurements by the non-radioisotopic logging tool; and processing the at least one input log of the second well bore to synthesize at least one output log of the second well bore.

2. The method of claim 1, further comprising:

selecting at least one well completion location based at least in part on the at least one output log of the second well bore; and perforating well bore casing at the at least one well completion location.

3. The method of claim 2, wherein the processing operation provides a density log and a neutron porosity log of the second well bore, and wherein the selecting operation comprises identifying cross-over intervals of the density and neutron porosity logs.

4. The method of claim 1, wherein the first well bore is a training well bore and the second well bore is a development well bore.

5. The method of claim 1, wherein the at least one input log collected from the first and second well bores comprises an open hole log and a cased hole log.

6. The method of claim 5, wherein the cased hole log is determined from measurements by a pulsed neutron capture logging tool.

7. The method of claim 5, wherein the cased hole log comprises a log in a set consisting of resistivity logs, sonic logs, gamma ray spectroscopy logs, production logs, and combinations thereof.

8. The method of claim 5, wherein the open hole log comprises a log in a set consisting of resistivity logs, sonic logs, nuclear magnetic resonance logs, gamma ray spectroscopy logs, spontaneous potential logs, and combinations thereof.

9. The method of claim 1, wherein the at least one output log comprises at least one of a log of neutron porosity and a log of formation density.

10. The method of claim 1, wherein the at least one input log comprises at least one of a log indicative of formation resistivity and a sonic log.

11. The method of claim 1, wherein the at least one input log comprises a log in a set consisting of natural gamma ray logs, induced gamma ray logs, sonic logs, nuclear magnetic resonance logs, and combinations thereof.

12. The method of claim 1, wherein the non-radioisotopic logging tool comprises a pulsed neutron source.

13. The method of claim 12, wherein the non-radioisotopic logging tool is a cased hole logging tool.

14. The method of claim 12, wherein the non-radioisotopic logging tool is a logging while drilling tool.

15. An information storage medium that, when placed in operable relation to a computer, provides the computer with well log synthesis software comprising:

a training process that generates a neural network for synthesizing one or more radioisotopic logging tool logs; and a transform process that applies the neural network to convert an input set of non-radioisotopic logging tool logs into an output set of one or more predicted radioisotopic logging tool logs in the form of an observable table or chart.

16. The medium of claim 15, wherein the neural network is part of a neural network ensemble, wherein the training process generates a set of neural networks having diversity in inputs and in complexity, and wherein the software further comprises:

a selection process that identifies a combination of neural networks from the set of neural networks to form the neural network ensemble.

17. The medium of claim 15, wherein the output set comprises at least one of a neutron porosity log and a density log.

18. The medium of claim 15, wherein the input set comprises a resistivity log and logs by a pulsed neutron logging tool.

19. The medium of claim 18, wherein the pulsed neutron logging tool is a cased hole logging tool.

20. The medium of claim 16, wherein the selection process identifies a combination of neural networks from the set having a desirable fitness measure, said fitness measure being based at least in part on a measure of negative correlation for each neural network in the combination.

21. A system for synthesizing one or more well logs, the system comprising:

a non-radioisotopic logging tool to obtain measurements in a well bore; and a computer to receive the measurements from the non-radioisotopic logging tool, wherein the computer synthesizes at least one of a density log and a neutron porosity log for display to a user using the measurements from the non-radioisotopic logging tool.

22. The system of claim 21, wherein the computer implements a neural network to convert multiple non-radioisotopic logs into at least one of a density log and a neutron porosity log.

23. The system of claim 22, further comprising a perforation tool to perforate casing in the well bore at positions selected based at least in part on at least one of a density log and a neutron porosity log synthesized by the computer.

24. A computer implemented well logging method that comprises:

obtaining a first log of a well bore by at least one of a resistivity tool and a sonic tool;

obtaining a pulsed neutron tool log of the well bore; and using a computer to combine the first log with the pulsed neutron tool log to synthesize and display a radioisotopic source tool log of the well bore.

25. The logging method of claim 24, wherein the combining operation employs a neural network ensemble to synthesize the radioisotopic source tool log.

26. The logging method of claim 24, wherein the radioisotopic source tool log is a neutron porosity log.

27. The logging method of claim 24, wherein the radioisotopic source tool log is a density log.

28. The logging method of claim 24, wherein the first log is a resistivity log.

* * * * *

UNITED STATES PATENT AND TRADEMARK OFFICE
CERTIFICATE OF CORRECTION

PATENT NO. : 7,587,373 B2  Page 1 of 1
APPLICATION NO. : 11/270284
DATED : September 8, 2009
INVENTOR(S) : Smith, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 428 days.

Signed and Sealed this

Twenty-first Day of September, 2010

David J. Kappos
*Director of the United States Patent and Trademark Office*